United States Patent [19]
Taylor

[11] Patent Number: 5,917,138
[45] Date of Patent: Jun. 29, 1999

[54] BOTTOM FEED—UPDRAFT GASIFICATION SYSTEM

[76] Inventor: Leland T. Taylor, 701 Madison Ave., N.E., Albuquerque, N.M. 87110

[21] Appl. No.: 08/764,632

[22] Filed: Dec. 5, 1996

Related U.S. Application Data

[60] Division of application No. 08/424,189, Apr. 19, 1995, Pat. No. 5,607,487, which is a continuation-in-part of application No. 08/292,922, Aug. 18, 1994, abandoned, which is a continuation of application No. 08/032,642, Mar. 17, 1993, abandoned.

[51] Int. Cl.[6] ....................................................... B03C 3/15
[52] U.S. Cl. ........................................ 96/61; 96/88; 96/96
[58] Field of Search ................................. 96/96, 52, 94, 96/61, 83, 92, 97, 88; 55/DIG. 38

[56] References Cited

U.S. PATENT DOCUMENTS

| | | | |
|---|---|---|---|
| 617,618 | 1/1899 | Thwaite | 96/97 X |
| 1,067,974 | 7/1913 | Cottrell | 96/96 X |
| 1,130,212 | 3/1915 | Steere | 96/97 X |
| 2,231,330 | 2/1941 | Gove | 96/96 |
| 3,157,479 | 11/1964 | Boles | 55/DIG. 38 |
| 3,967,940 | 7/1976 | Hirano et al. | 96/52 |
| 5,277,703 | 1/1994 | Sklenak et al. | 96/94 X |
| 5,607,487 | 3/1997 | Taylor | 48/111 |

FOREIGN PATENT DOCUMENTS

| | | | |
|---|---|---|---|
| 52-74961 | 6/1977 | Japan | 96/61 |
| 364346 | 2/1973 | U.S.S.R. | 96/61 |

*Primary Examiner*—Richard L. Chiesa
*Attorney, Agent, or Firm*—Roger F. Phillips

[57] ABSTRACT

A gasification system for solid wastes having a thermal reactor and a mechanical gas cleaner, an indirect heat exchange cooler, and an electrostatic precipitator for cleaning and cooling the produced gas. Feed material is continuously fed to the central section of the thermal reactor above an air introduction manifold and nozzles and in an upward direction, forming a stratified charge. As feed material moves upward and outward from the reactor center it is reduced to ash. An agitator assures contact between the hot particulate product and hot gases resulting in gasification of the feed material and net movement to the sidewall of the thermal reactor, forming ash. The air introduction nozzles serve as a grate. Ash descends along the sidewall to the reactor base for removal. The mechanical cleaner has a high speed rotating brush-like gas separator element and scraper combination which removes condensed tars and particulates from the produced gas stream. The device is self cleaning in that condensed tars and particulates agglomerate on the high speed rotating bristle elements and, upon reaching adequate size and mass, are thrown off by centrifugal force to the cylindrical sidewall, where scrapers remove accumulated material which falls to the separator base for removal. An electrostatic precipitator having a cylindrical brush-like electrode suspended from one end by an insulated arm, removes remaining particles or aerosols from the product gas.

5 Claims, 9 Drawing Sheets

BOTTOM FEED— UPDRAFT GASIFICATION SYSTEM

This application is a divisional of application Ser. No. 08/424,189 filed Apr. 19, 1995 and now U.S. Pat. No. 5,607,487, which is a continuation-in-part of application Ser. No. 08/292,922 filed Aug. 18, 1994 and now abandoned, which is a continuation of application Ser. No. 08/032,642 filed Mar. 17,1993 and now abandoned.

BACKGROUND OF THE INVENTION

1. Field of the Invention

The present invention relates to gasification of solid organic material. More specifically, the present invention relates to gasification of organic solid material to produce combustible gas to be utilized for energy production and/or recover chemical components from pyrolyzed organic material.

2. Discussion of the Prior Art

Gasification to produce combustible gases from the destructive distillation of organic solid materials is known in the prior art and entails using the heat of combustion of at least a portion of the organic material to maintain a pyrolysis reaction. Organic material to be gasified is introduced to the gasification reactor, typically from the top, thereof. An oxygen containing gas such as air is introduced to the thermal reactor below the organic material to form a combustion zone where the residue of the gasification process is combusted to produce the heat required for the gasification reaction. The hot gases from the combustion zone are forced upward through the mass of organic material by the introduced air. The heated air and gases cause destructive distillation of the organic material and the generation of hydrogen, carbon monoxide and other carbon-containing gases including carbohydrate gases according to reactions such as the following:

$$C_xH_yO_z + O_2 = C + CO + CO_2 + C_{x1-xn}H_{y1-yn}O_{zl-zn}$$

In an efficient gasification device in which the desired output is a combustible product gas, suitable for use in internal combustion engines, boilers, turbines or heating devices, the free carbon in the products of combustion should be minimized or effectively made zero. Further, the amount of carbon dioxide should be minimized.

An important aspect of the design of a thermal gasification reactor is the provision for intimate contact of the newly introduced organic material with the hot air and gases from the combustion zone to promote efficient gasification while providing for the efficient removal of carbon-containing solid products from the gasification zone to the combustion zone where they provide fuel for producing heat for the thermal reaction. Many organic materials can form large agglomerate masses or clinkers under the conditions of operation of the gasification reactor which can halt movement of material through the reactor and moving parts such as agitators.

In U.S. Pat. No. 4,445,910 (1984), Zimmerman shows a pyrolysis system for generating gas and producing char particularly adapted for processing cellulosic waste material such as sawdust, wherein feed material is fed upward into the base of the reactor chamber and air is fed radially around the chamber sidewall. Also disclosed is a system for cleaning the product gas. Although the Zimmerman system may be efficient for the processing of finely divided material such as sawdust, materials with larger particle sizes or which would tend to form clinkers under gasification conditions would be inappropriate for feeding the Zimmerman reactor due to the relatively restricted configuration of the solids removal mechanism. The Zimmerman system is directed toward carrying out a pyrolysis process rather than the gasification process of the present invention as the reactor configuration of Zimmerman will not react the char into ash.

In U.S. Pat. No. 4,614,523(1986), Soares discloses a down flow gasifier for waste wood and biomass having downward directed air introduction nozzles and a reactor cooling jacket. The Soares system, however, is a complicated structure, the gas offtake would be subject to clogging by deposition of tars and particulates carried by the product gaseous effluent when certain feed materials are emoloyed, and many fine materials will restrict air flow through the bed.

In U.S. Pat. No. 4,971,599(1990), Cordell et al. disclose a biomass gasifier with feed material being fed upward to the base of the reactor. The presence of a grate in the Cordell et al. reactor could lead to clogging by clinkers when certain feed materials are used.

Another problem encountered in solids gasification and thermal distillation systems is the handling of particulate and tar laden gaseous effluent. Tars and particulates must be removed and the gas cooled before it becomes a useful product for energy recovery. Particulate and condensed tars tend to clog conduits, coolers, and separators. In U.S. Pat. No. 4,069,133(1978), Unverferth shows a rotating spiral assembly for cleaning an overhead conduit of a thermal distillation unit and returning condensed tars and particulates back to the process. The assembly of Unverferth does not employ any active condensation and cleaning apparatus at the point of gaseous effluent exit from the distillation unit for removal of tar and particulates from the gaseous effluent for return to the distillation unit. The Zimmerman -910 patent shows a typical gas purification system employing extensive gas-liquid contact devices. These systems suffer from the disadvantages of size, high energy losses, complexity, high liquid use, loading from evaporated liquids, and clogging and maintenance problems.

These and other deficiencies of prior gasification systems are met in the gasification system of the present invention. The gasification thermal reactor of the present invention provides the capability of processing a large variety of feed materials ranging from wood and biomass materials to municipal solid waste, dewatered sewage sludge, discarded rubber from articles such as used tires, plastics, industrial process wastes, medical/hospital wastes, and the distillation of oil shales. The inventive system provides for feeding material continuously through a conduit to the center of a central section of the thermal reactor and in an upward direction. As the feed material is conveyed by an auger system to the feed point, it is preheated through conduit walls exposed to hot solids in the combustion zone. Preheated feed material is then forced upward by subsequently introduced feed material into a gasification zone, where it forms a stratified charge and is contacted with upwardly traveling hot gases from the combustion zone and hot particulate products of the gasification reaction. As feed material moves upward and outward from the center of the reactor it is reduced to ash as a result of reaction with the upwardly moving oxidizing gas, resulting in less tar and oils in the output gaseous effluent than in other known gasifiers. An agitator assures efficient contact between the hot particulate product and hot gases resulting in gasification of the material and a net movement of hot particulate product to the sidewall of the thermal reactor. Since the complete volatilization of material occurs at this stage and the gas produced is partially volatilized, the output gaseous effluent from the thermal reactor contains less tars than produced from known gasifiers. This hot mixture of particulate material and ash descends along the sidewall and around the feed conduit and between air introduction nozzles to the combustion zone. Due to the unique design of the air introduction nozzles, a conventional grate is not required. The air introduction nozzles are directed radially inward from a manifold integral with the inner surface of the reactor sidewall so as to function as a grate. Clinkers, however, can easily move through the nozzle structure since the nozzles are more widely spaced near the reactor wall. Clinkers formed near the center of the reactor slowly move outward toward the sidewall where they fall between the nozzles. The nozzles direct air preheated by its travel through the hot manifold and nozzles downward into the combustion zone. For the reaction of hydrogen-deficient fuels such as tires and coal, a preferred embodiment of the invention provides an automatic control system for injection of water with the preheated air by means of a water injection spray ring located within the annulus of the air preheat manifold. The water provides hydrogen and oxygen to the reactor when reacted with high temperature char(963 degrees C. or higher). The reaction of hot carbon and water to form carbon monoxide and hydrogen assists in oxidation of the char(carbon), as the water causes oxidation of the carbon and more complete reduction to ash. The ash is created when the high temperature pre-heated air reacts with the char to reduce the char to ash and this reaction is enhanced when steam is present to produce the reaction. Injection of the water is controlled by means of a temperature sensor and when the measured temperature reaches a certain limit, means is provided for proportional injection of the water to the manifold. Ash is removed from the lower section of the reactor and a mechanical breaker is employed to break and comminute any agglomerates or clinkers which would otherwise impede ash removal. Clinkers are formed in the reactor when the ash produced has a low melting point. Any unreacted material in the ash agglomerates is exposed for reaction as a result of this comminuting action. An agitator may also assist in the ash flow. The inventive reactor avoids the use of a grate, as in Cordell et al. -599, which would be subject to clogging by clinkers in the descending solid material, while avoiding a top-feeding system with its attendant complexities in removing product gaseous effluent as in the -523 patent to Soares.

The manner of feeding and distribution of the inventive reactor also increases the energy present in the lower reaction zone by introducing fresh unreacted feedstock into the region. This fresh fuel acts to increase the thermodynamic reaction rate in the inventive reactor and accelerate the reduction of char to ash by providing energy for this reaction. The volatilized compounds evolved from the fresh feedstock partially combust and increase the reaction rate, additionally. Any corresponding gasification of char in the Zimmermann -910 device will occur slowly or not at all.

The inventive system provides for the efficient cooling and cleaning of the gaseous effluent without direct contact with liquids as in the -910 patent to Zimmerman, resulting in a more efficient and reliable gas treating system. No additional gas loading from vaporized liquid is present and no clogging of liquid recycle and spray equipment can occur. The inventive high speed rotating brush-like gas separator element and scraper combination of the present invention efficiently removes tars and particulates from an indirectly cooled gas stream without the problems of direct liquid contact as discussed above. Cooling may be provided by means of internally mounted cooling tubes, a cooling jacket on the exterior wall of the unit, or both cooling tubes and cooling jacket. Although the use of brush-like elements for gas separation are known in the prior art, as shown by Hollingsworth, U.S. Pat. Nos. 2,998,099(1961) and 2,922,489(1960), and Moore, U.S. Pat. No. 5,111,547(1992), the novel combination of high speed brush rotation and a wall scraper of the present invention provides for highly efficient gas separation in the difficult tar and particulate environment of the present invention. The device is self cleaning in that condensed tars and particulates agglomerate on the high speed rotating bristle elements and, upon reaching adequate size and mass are thrown off the bristle by centrifugal force to the cleaner sidewall where scrapers remove accumulated material, which in turn falls to the separator base for removal. Provisions are made for recycle of separated tars and particulates to the reactor, reducing by-products and improving efficiency of the inventive system while increasing the heating value of the product gas. Automatic controls provide for safe and efficient operation of the inventive thermal reactor.

A cooling module of known design is provided in the inventive system for cooling gaseous effluent leaving the mechanical separator, the cooling module being of an indirect heat exchange type to avoid the addition of cooling fluid directly to the gas stream.

A novel electrostatic precipitator is provided to further remove remaining solid condensed particles and aerosols from the product gas stream. The electrostatic precipitator of the present invention is self cleaning due to the non-rotating cylindrical brush-like configuration of its charging electrode and the unique manner in which the electrode is suspended, i.e., vertically by one end from one end of an arm, the other end of which is immersed in a temperature controlled oil bath and connected to a power source via an insulator projecting through the base of the oil bath. The oil bath is temperature controlled to prevent water and other accumulations in the bath. Charged particles are forced to the outside wall of the precipitator and flow therealong to a collection point at the base of the precipitator due to the force of gravity, resulting in self cleaning of the collector electrode. The employment of electrostatically charged brush-type collector elements is known as shown in the dryer of Stickel, U.S. Pat. No. 2,780,009(1957), but Stickel does not teach the suspension system of the present invention which allows for gravity induced self cleaning, nor does Stickel provide water jacket cooling or add cooling coils internally to the unit. Stickel does not contemplate the cleaning of conductive gases such as those formed in the present inventive system where acetic acid and water are present in a potentially explosive gas stream. In U.S. Pat. No. 3,111,024 to Sarver, a vertically suspended brush-type gas separator is shown, but it is not electrostatically charged and has gas back flow and an active oscillator employed in its cleaning cycle. Provision is made in the inventive system to collect the tar and particle laden condensate from the base of the cooling module and the electrostatic precipitator, respectively, and to separate and remove condensed water, recycling the tars, oils, and particulates to the thermal reactor.

SUMMARY OF THE INVENTION

The present invention relates to a system for gasification of a wide range of solid organic materials to yield a useful product gas output which overcomes gas cleaning and cooling problems and clogging solids clogging problems in prior art gasification systems.

An object of the invention is to provide an organic solids gasification system free from clogging by processed solids.

A further object of the invention is to provide a gasification system employing indirect cooling of produced gas to avoid vapor loading and clogging or handling complexity problems of recirculating liquid spray systems.

A still further object of the invention is to provide a gasification system maintaining heat efficiency in preheating solids and air feed.

A still further object of the invention is to provide a gasification system that permits regulation and balancing of air flow rate, and input material feed rate, while at the same time minimizing carbon and carbon dioxide output and maximizing volume product gas output and quality.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise: (a) a cylindrical thermal reactor with a tapering lower body, preferably conical or inverted pyramidal, housing an air manifold with downward directed air input that supports incoming solid waste material which is fed by an auger and feed system from below, upwardly from outlet into a central section of the thermal reactor above and spaced from the air manifold, (b) an air manifold injection system with input air volume control (c) a clinker breaker system rotating about a horizontal axis to break up large solid particulate by-products of the gasifier reaction, (d) a rotary agitation system operating above the air manifold and feed auger outlet, (e) the feed auger having the rotating portion terminated a predetermined distance below and short of the outlet, creating a seal to prevent loss of product gases, (f) a feedback and control system that senses the level of solid material in the reactor and varies and balances the auger input rate against the air flow, and material consumption rates, (g) a feedback and control system that measures product gas pressure and varies air injection and feed rates to maintain constant product gas pressure, (h) a feedback and control system that measures reactor temperature(s) and varies feed rate and air and/or water injection rates to optimize the process, (i) a mechanical cleaner employing high speed rotating metallic brushes and a concentric and coaxial scraper mechanism to collect particulate build-up on the walls of the cleaner which is transferred from the brushes to the walls of the cleaner by centrifugal force, (j) an electrostatic precipitator system employing charged metallic brushes for separation of particulates and aerosols from the product gas, (k) an electrically isolated precipitator brush support system (l) an indirect heat exchange cooler for cooling process gas between the mechanical cleaner the electrostatic precipitator, (m) a recycle auger to return collected solids from the mechanical cleaner to the thermal reactor, and (n) a recycle conduit to return condensed tars and oils from the cooler and the electrostatic precipitator to the thermal reactor.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

The present invention provides a gasification system that employs a feed system, gasification reactor, a mechanical cleaner, a cooling module and an electrostatic precipitator, to convert waste products into burnable gas and a reduced volume of easily disposable ash. Waste products are introduced into a sealed reactor vessel and agitated at an elevated temperature. Air inlet to the vessel is controlled by one of a combination of three different feedback system designs to result in partial to complete oxidation of the waste materials and output of a particulate-laden gaseous effluent. The gaseous effluent is mechanically cleaned, cooled and electrostatically cleaned by additional apparatus to produce a clean burning product gas. Particulates, tar and oils removed from the gaseous effluent of the gasification reactor are recycled back into the thermal reactor for additional gas extraction. Water removed from the gaseous effluent is discharged.

A wide variety of solid or semi-solid organic feedstock which by itself or in combination has a heating value of at least 5,000 BTU per pound are useful in the present invention. Usable feedstocks include sorted municipal and commercial waste, shredded paper, wood waste, dewatered sewage sludge, scrap tires, agricultural waste, automobile shredder "Fluff", paint sludge, coal, oil field wastes and hydrocarbon contaminated soils, and oil shale. Liquid wastes may be mixed with solids prior to processing in the inventive system.

Depending on the nature of the feedstock, either low BTU gas for energy production or a range of by-products such as diesel fuel and asphaltic materials(from tires or oil shale); ammonia(from many feedstocks); liquified gases such as hydrogen nitrogen, carbon dioxide(from many feedstocks) and various other compounds may be obtained as products of the inventive system.

Figure 1:
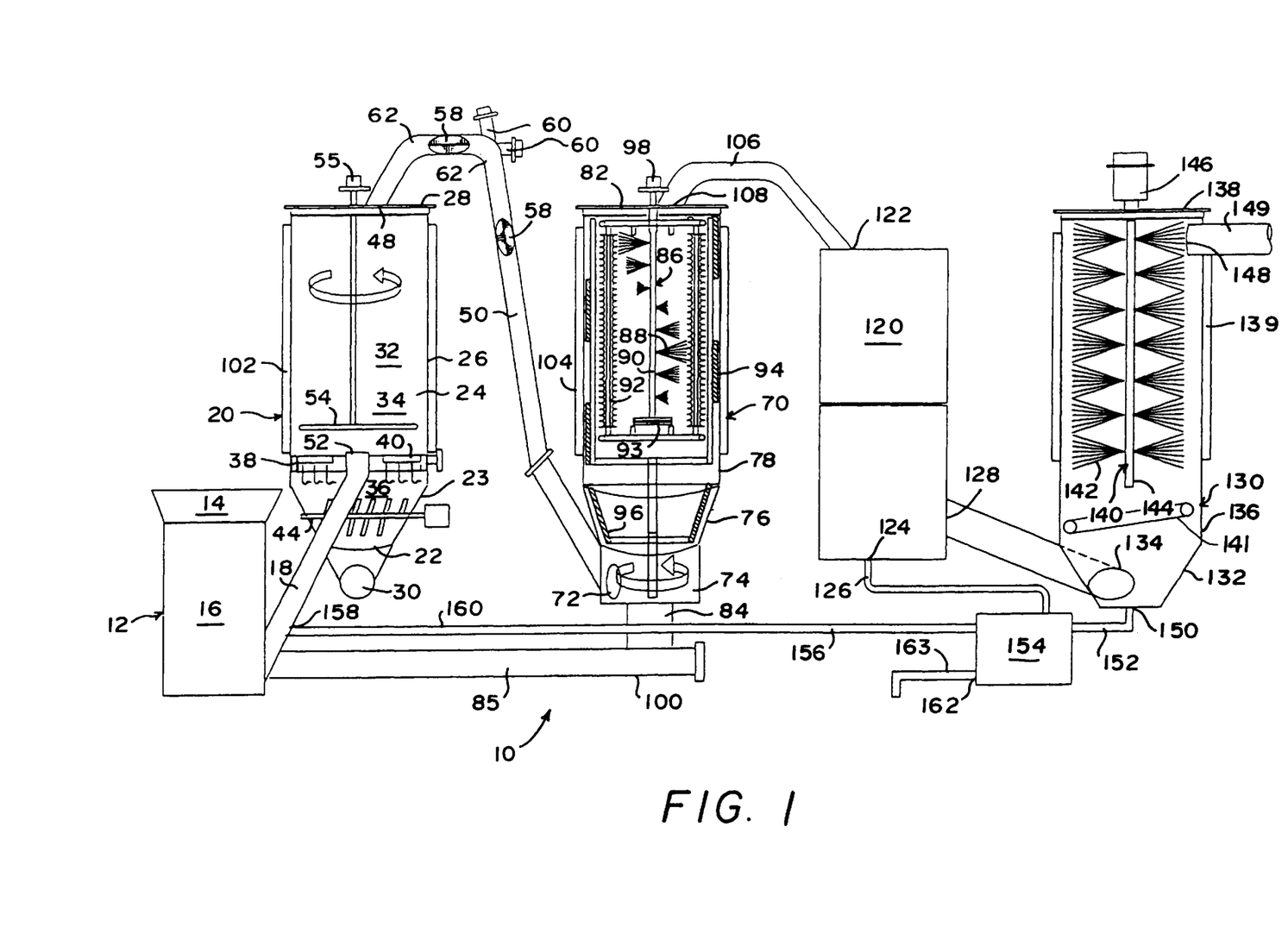
FIG. 1 shows a diagrammatic view in elevation of the entire gasification system of the present invention.
Figure 2:
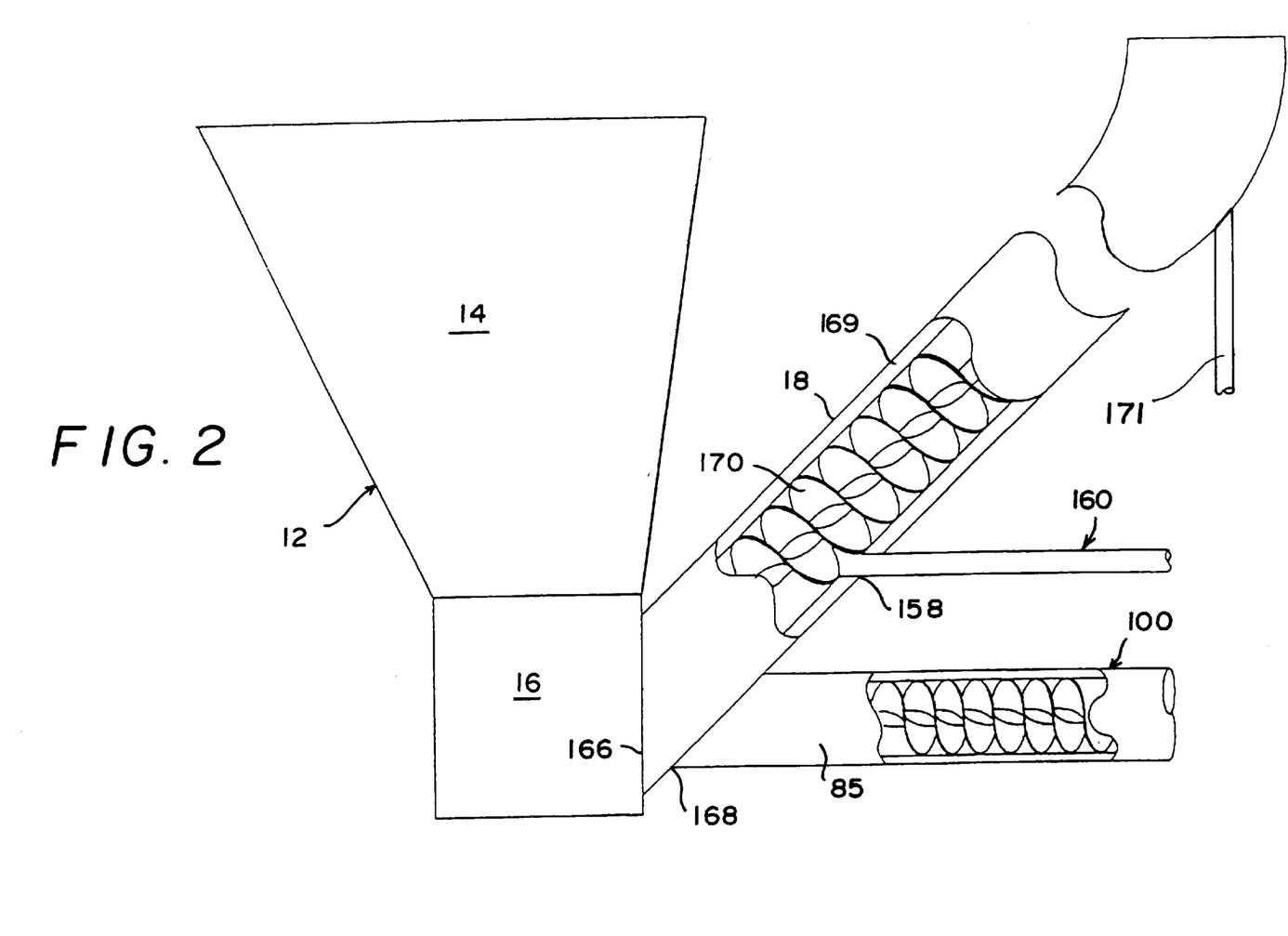
FIG. 2 shows a detail view in elevation of a preferred embodiment of the feeder input auger system of FIG. 1.
Figure 3:
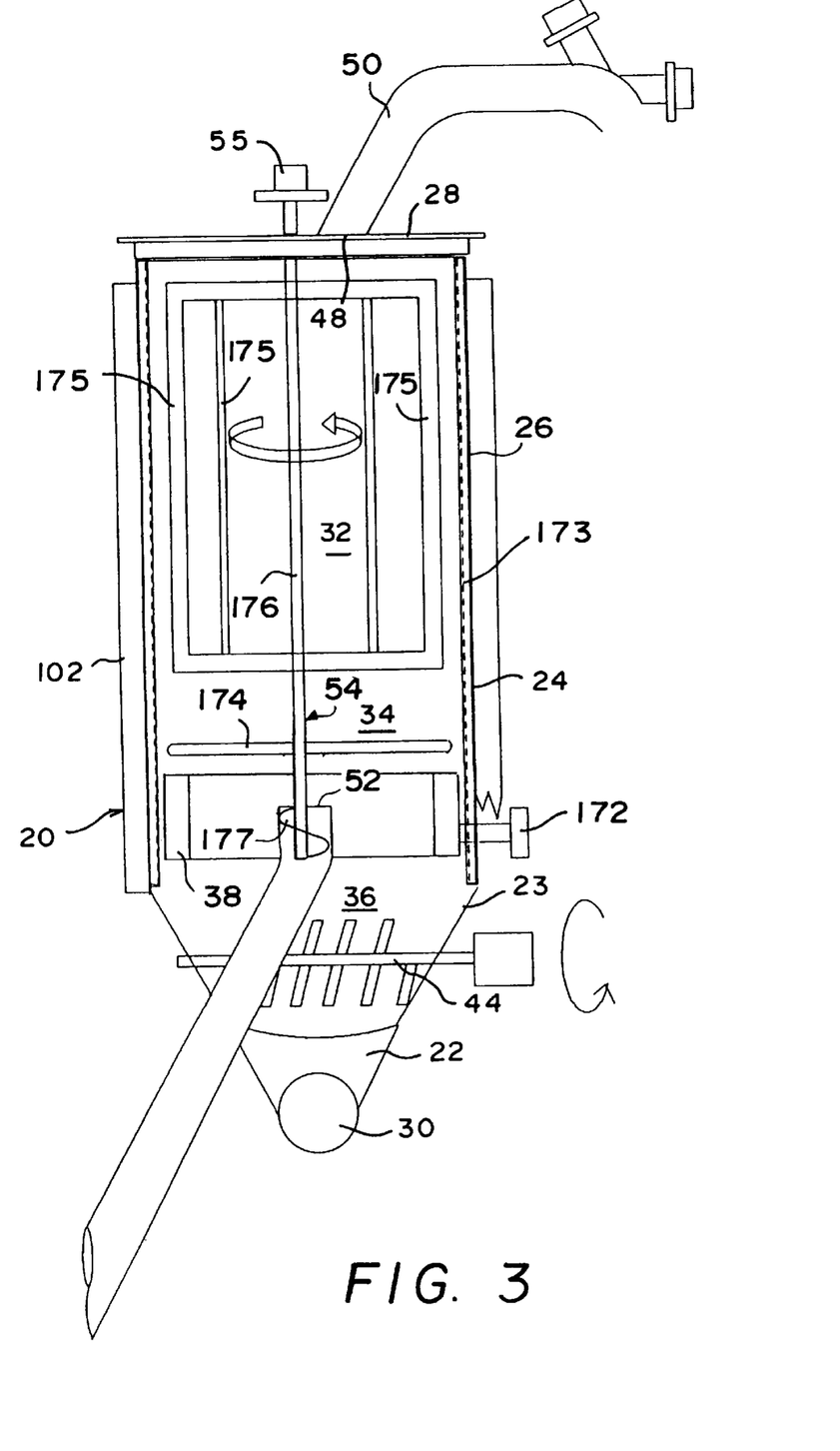
FIG. 3. shows a detail view in elevation of a preferred embodiment of the thermal reactor of FIG. 1.

Referring to FIGS. 1, 2, and 3, there is shown a cross section in elevation of the gasification system and details of the auger feed system and the thermal reactor, respectively, of the present invention. The gasification system 10 of the invention is fed by feeder input auger system 12, which accepts waste material input and recycled solids, tar and oil for loading for the gasification system 10. Feeder input auger system 12 includes top feeder bin 14 of a truncated inverted pyramidal configuration, feeding downward into a box-like lock hopper 16, of conventional design, and subsequently to an obliquely oriented main feed auger 18.

Thermal reactor 20 has an inverted conically shaped lower portion 22, having conical wall 23, and a cylindrically shaped upper portion 24, having cylindrical wall 26. The upper portion of thermal reactor 20, is sealed with cover plate 28. The lower portion of thermal reactor 20, terminates in ash discharge auger 30 and lock hopper(not shown). Upper cylindrical portion 24 includes upper section 32, and central section 34. Lower section 36 is included in the lower part of upper cylindrical portion 24 and lower conical portion 22. Air input manifold 38, having radially extending air introduction nozzles 40, is integral with the inner surface of cylindrical wall 26 so as to divide central section 34 from lower section 36. Ash clinker breaker 44 is located in conical lower portion 22, above ash discharge auger 30. Reactor exit port 48 is located in cover plate 28. Reactor conduit 50 is connected to thermal reactor 20 at reactor exit port 48.

Main feed auger 18 extends through conical wall 23, through lower section 36 and discharges through feed auger outlet 52 upward into central section 34 along the central axis, thereof. Material agitator 54 is located in central section 34 above and spaced from feed auger outlet 52. The ash discharge auger 30 and lock hopper(not shown) are sealed to maintain pressure in thermal reactor 20 and prevent the loss of gaseous effluent.

Reactor conduit 50 contains internal rotating brushes 58 driven by hydraulic pipe cleaner drives 60 located at bends 62 in reactor conduit 50. Other suitable drives may be used such as electric. Reactor conduit 50 is connected to mechanical cleaner 70 at tangential input port 72, located a cylindrical base 74 of the mechanical cleaner 70. Mechanical cleaner 70, includes lower conical section 76, located above tangential input port 72 of base 74 and upper cylindrical section 78 above conical section 76. Cover plate 82 forms the top of mechanical cleaner 70. The bottom discharge 84 of mechanical cleaner 70 is open to allow for passage of solids through solids auger return 85 for recycle to feed lock hopper 16.

Mechanical cleaner 70 houses high speed rotating metallic brush element 86 having bristles 88 mounted on shaft 90. Brush element 86 revolves at about 3000 revolutions per minute within a stationary finned cooling cage, 92 in upper cylindrical section 78. Harmonic balancer 93, a disk-shaped metallic element is attached at the lower end of shaft 90 and serves to reduce vibration and whipping in brush-like element 86 during high speed operation. In a typical installation the harmonic balancer 93 is a steel disk or pulley about 2" thick and 3' in diameter and weighing about from 90 to 100 lb. Sizing of a particular balancer is determined by standard engineering practice. Upper scraper brushes 94 rotate at a low speed outboard of the finned cooling cage 92. Upper scraper brushes 94 sweep the interior of upper cylindrical section 78, and lower scraper brushes 96 sweep the interior of lower conical section 76 of the mechanical cleaner 70. The high speed brush element 86 are driven by a hydraulic motor 98 mounted at the cover plate 82. The low speed upper and lower scraper brushes 94 and 96 are driven from the cylindrical base 74 of the mechanical cleaner 70 by a motor(not shown) at about 1 revolution per minute. The open bottom discharge 84 of the mechanical cleaner 70 communicates with solids recycle circuit 100. Thermal reactor 20 and/or mechanical cleaner 70 may be wrapped in boiler-tube-type heat dissipating water jackets 102 and 104, respectively, as an additional mechanism for heat removal.

Mechanical cleaner conduit 106 connects output port 108 of the mechanical cleaner 70 with indirect cooling module 120 at input port 122. Cooling module 120 contains fluid cooled indirect heat exchangers of known construction(not shown). Condensate water exits cooling module 120, through cooler drain 124, and drain conduit 126. Gas output port 128 of the cooling module 120 is similarly connected by cooling module conduit 128 to electrostatic precipitator 130 at conical base 132 at tangential input port 134.

Electrostatic precipitator 130 is a vertically disposed, generally cylindrical structure having a conically shaped base 132 supporting cylindrical wall 136 capped with seal plate 138. Electrostatic precipitator 130 also contains isolated and suspended stationary brushes 140 having radially extending bristles 142 mounted on and attached to shaft 144 along its length, shaft 144 being suspended by one end from isolation and suspension system 146 along the central vertical axis of cylindrical wall 136. Isolation and suspension system 146, is secured to electrostatic precipitator 130 at seal plate 138. A cooling jacket 139 surrounds cylindrical wall 136 for additional cooling. Further additional cooling is provided by internal cooling coils 141 located within the interior of the cylindrical structure. Product gas departs the system 10 through product gas outlet port 148, located just below seal plate 138, on cylindrical wall 136 of electrostatic precipitator 130 and into product gas conduit 149.

Precipitator base 132 of the electrostatic precipitator 130 is connected through condensate drain 150 and tar/oil/water conduit 152 to a tar/oil/water separator 154 of known construction. Tar/oil/water separator 154 is connected by tar/oil recycle conduit 156 to main feed auger 18 at tar/oil recycle port 158, completing tar/oil recycle circuit 160. The tar/oil/water separator 154 includes a water discharge port 162 leading to discharge conduit 163.

Referring more particularly to FIG. 2, there is shown an elevation view in detail of the feed input auger system of FIG. 1. Main feed auger 18 of input auger system 12 serves as a feed conduit and is connected to three sources of material; top feeder bin 14 connected to lock-hopper 16, tar/oil recycle circuit 160, and solids auger return 85 of solids recycle circuit 100. Lock hopper 16 is joined to main feed auger 18 at the auger's lower origin 166. Tar/oil recycle circuit 160 is joined to main feed auger 18 at tar/oil recycle port 158. Solids auger return 85 is joined to main feed auger 18 at solids recycle input port 168 located in auger wall 169. Main feed auger blades 170, rotating axially within main feed auger 18 are preferably of such diameter as to closely fit within auger wall 169 to maintain an upward feeding action for the solids therein. Main feed auger blades 170 terminate a specified distance(about one and one-half auger blade diameters) short of the feed auger outlet 52(see FIG. 1). In a preferred embodiment an air injector 171 is located in the vicinity of feed auger outlet 52 such as at the terminal point of feed auger blades 170 to provide for injection of air into the feed material to assist in its movement to outlet 52 to prevent material packing in auger 18.

Referring more particularly to FIG. 3, there is shown an elevation view in detail of a preferred embodiment of thermal reactor 20 of FIG. 1. The conical shaped lower portion 22 of thermal reactor 20 contains ash discharge auger 30 at its base. Ash clinker breaker 44 is located above and spaced from ash discharge auger 30 within conical portion 22. Air manifold 38 and air inlet 172 are positioned near the bottom of the cylindrically shaped upper portion 24 of thermal reactor 20, dividing the central section 34 from lower section 36. Refractory liner 173 may be located on the inner wall of upper cylindrical portion 24 and may be made of fire brick or suitable cast refractory. Material agitator 54 has radially disposed agitator blades 174 located above and spaced from air input manifold 38 and feed auger outlet 52. In a preferred embodiment, scraper blades 175 sweep the interior wall of upper section 32 of thermal reactor 20, blades 175 being connected to and driven by rotating shaft 176 of material agitator 54 rotating at from about 1 to 2 revolutions per minute. In a further preferred embodiment rotating shaft 176 extends into feed auger outlet 52 where it drives outlet auger 177. Coverplate 28 of cylindrical shaped upper portion 24 of thermal reactor 20 contains reactor exit port 48 and agitator hydraulic drive motor 55 driving shaft 176. Clinker breaker 44 acts as a fused material comminuter and includes a steel shaft which is hydraulically driven and operates when ash discharge auger 30 is operated. Clinker breaker 44 has radially extending blades of flat steel bar have varying lengths selected to conform with the interior wall of conically shaped lower portion 22 of reactor 20. The blades are preferably set at an angle of about 45 degrees in relation to the longitudinal axis of the shaft and are distributed along and around the shaft. Clinker breaker 44 acts not only to break fused material to promote flow of solid materials through reactor 20, but the agitation produced thereby promotes further reaction of unreacted solid material.

Figure 4A:
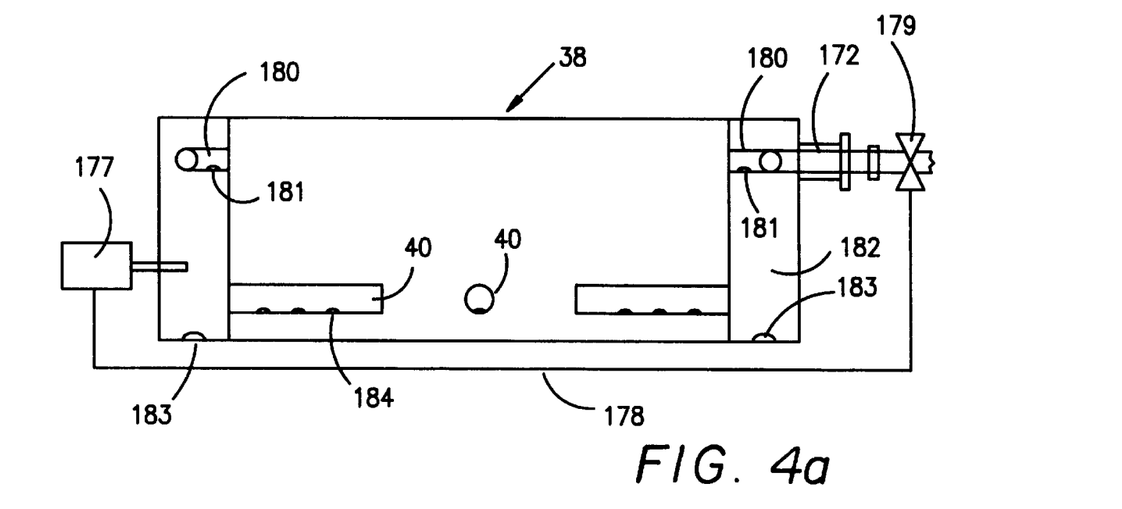
FIG. 4a shows a view in elevation of a preferred embodiment of the air input manifold of FIG. 3.
Figure 4B:
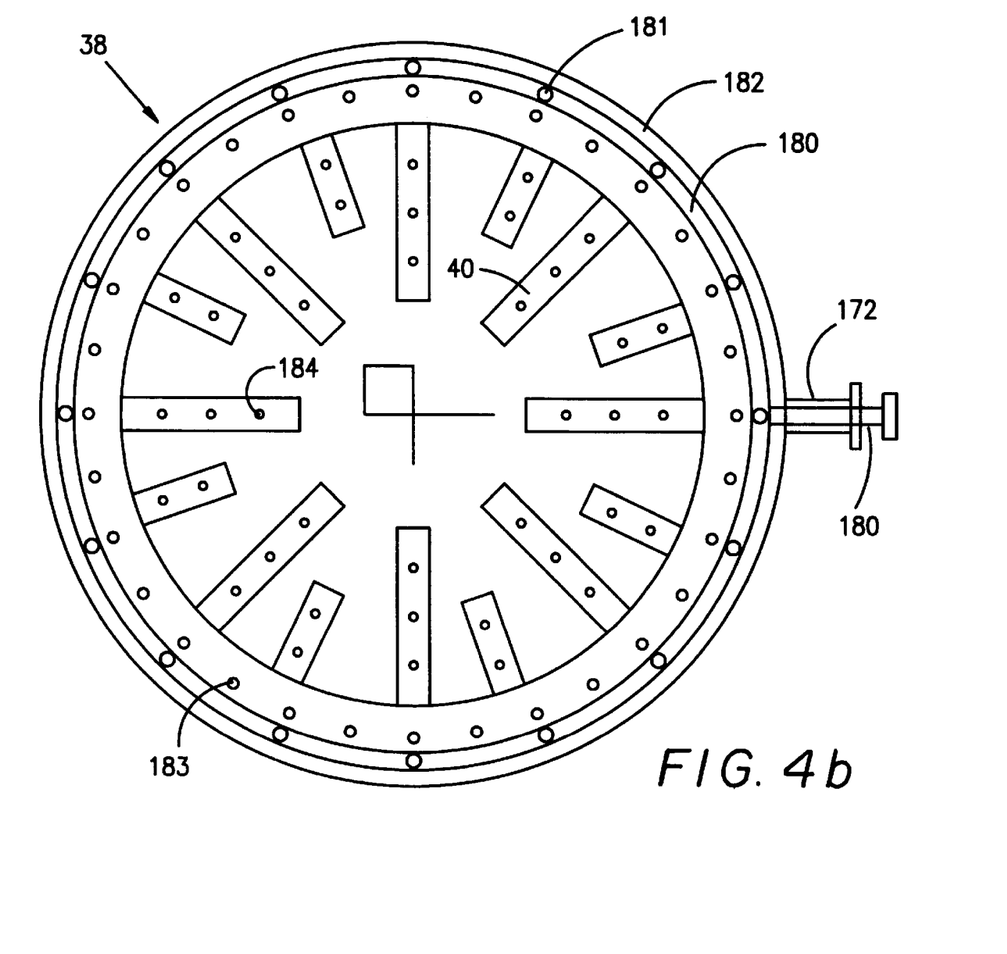
FIG. 4b shows a bottom detail plan view of a preferred embodiment of the air input manifold of FIG. 3.

Referring to FIGS. 4a and 4b, there is shown an elevation detail view and bottom detail view, respectively, of a preferred embodiment of the air input manifold system of the thermal reactor of FIG. 3. For clarity certain nozzles are deleted from FIG. 4a. FIG. 4a further illustrates an automatic control system for supplying water to a spray head located in air manifold system 38. The air manifold system 38 is supplied with air or other oxygen-containing or oxidizing gas through air inlet 172. Temperature sensor 177 is connected by control line 178 to inlet water control valve 179, which controls the addition of water to water injection spray head 180. Water injection spray head 180, having downwardly directed water nozzles 181, is located in the upper portion of annular chamber 182 of air manifold system 38. Annular chamber 182, which is rectangular in cross section, preferably has a height of about 50% of the total diameter of manifold 38, air inlet 172 being located in the upper portion thereof. Air manifold 38 has multiple nozzles, 40, which radiate inward from annular chamber 182 toward a central axis. Annular chamber 182 has multiple downward facing air outlets 183. Each nozzle 40 has multiple downward facing air outlets 184. Nozzles 40 may be of varying lengths to provide for desired air distribution and solids flow.

Figure 5:
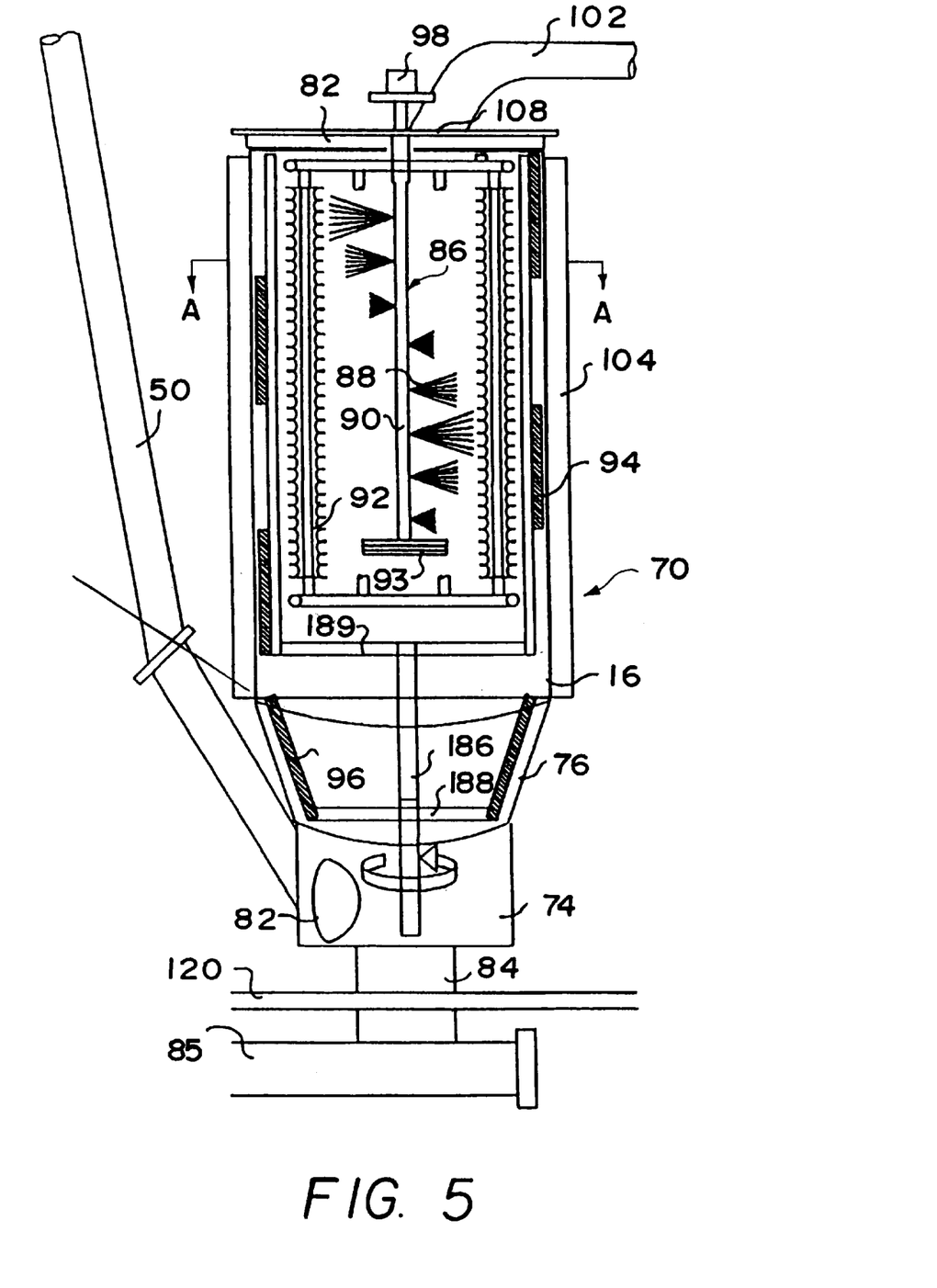
FIG. 5 shows a detail view in elevation of the mechanical cleaner of FIG. 1.

Referring to FIG. 5, there is shown an elevation view in detail of the mechanical cleaner of FIG. 1. Reactor conduit 50, which originates at thermal reactor 20(see FIG. 1), joins the mechanical cleaner 70 at the tangential cleaner input port 185. Tangential port 185 is a preferred embodiment over port 72 of FIG. 1 and provides swirling gas flow upward through the mechanical cleaner 70. Vertical drive shaft 186, originating at and driven by a motor (not shown) from below mechanical cleaner 70, is connected by arms 188 to two sets of scraper brushes 96, which sweep the inner wall of lower conical section 76. Scraper brushes 94 are connected to drive shaft 186 by radially extending arms 189 and sweep the inner wall of upper cylindrical section 78 of mechanical cleaner 70. Scraper brushes 94 have their bristled sections vertically staggered in order to sweep substantially all of the inner wall of upper cylindrical section 78. In cylindrical section 78, stationary tubing cooling cage 92 is suspended just inboard of the scraper brushes 94. The tubing cooling cage 92 surrounds high speed rotating brush-like element 86, powered by hydraulic drive motor 98, located on coverplate 82. The bottom of mechanical cleaner 70 is open to bottom discharge 84 to discharge solids to solids auger return 85 of recycle system 100 (see FIG. 1). Gases depart mechanical cleaner 70 through cleaner output port 108. In a preferred embodiment bristles 88 of brush element 86 are located along shaft 90 so as to form a helix or double helix having an axis along the shaft. Shaft 90 is rotated in such a direction that rotating brush element 86 provides a pumping action which assists in moving the particle laden gaseous effluent from the lower section 76 to the upper section 78 of mechanical cleaner 70.

Figure 6:
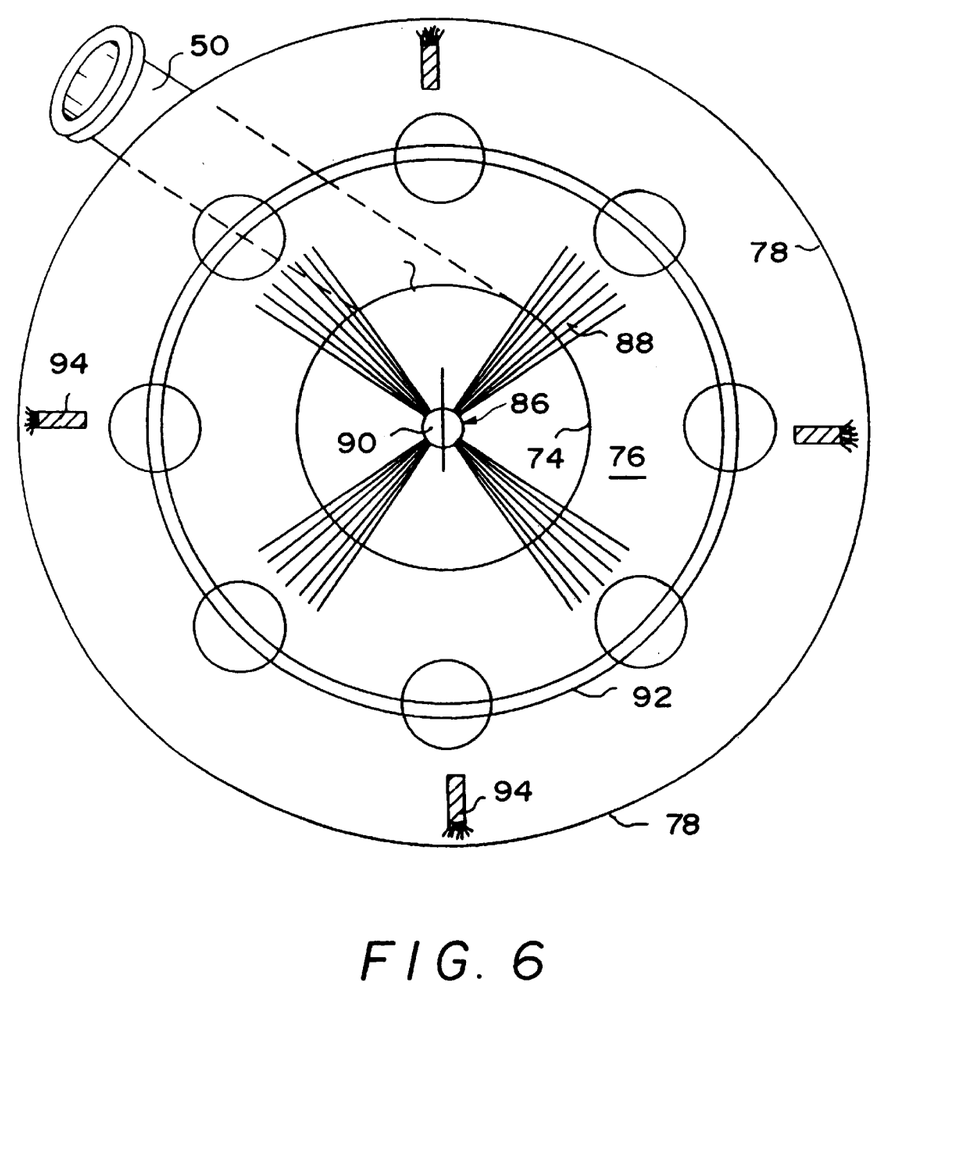
FIG. 6 shows a sectional view of the mechanical cleaner at A—A of FIG. 1.

Referring to FIG. 6, there is shown a plan view through section A—A of FIG. 5(the harmonic balancer, lower scraper brushes, and scraper arms are not shown). Upper scraper brushes 94 rotate outboard of stationary finned tubing cooling cage 92. High speed brushes 86 rotate inboard of stationary finned tubing cooling cage 92. Reactor conduit 50 is tangentially connected to the mechanical cleaner 70 at tangential port 185 of cylindrical base 74.

Figure 7:
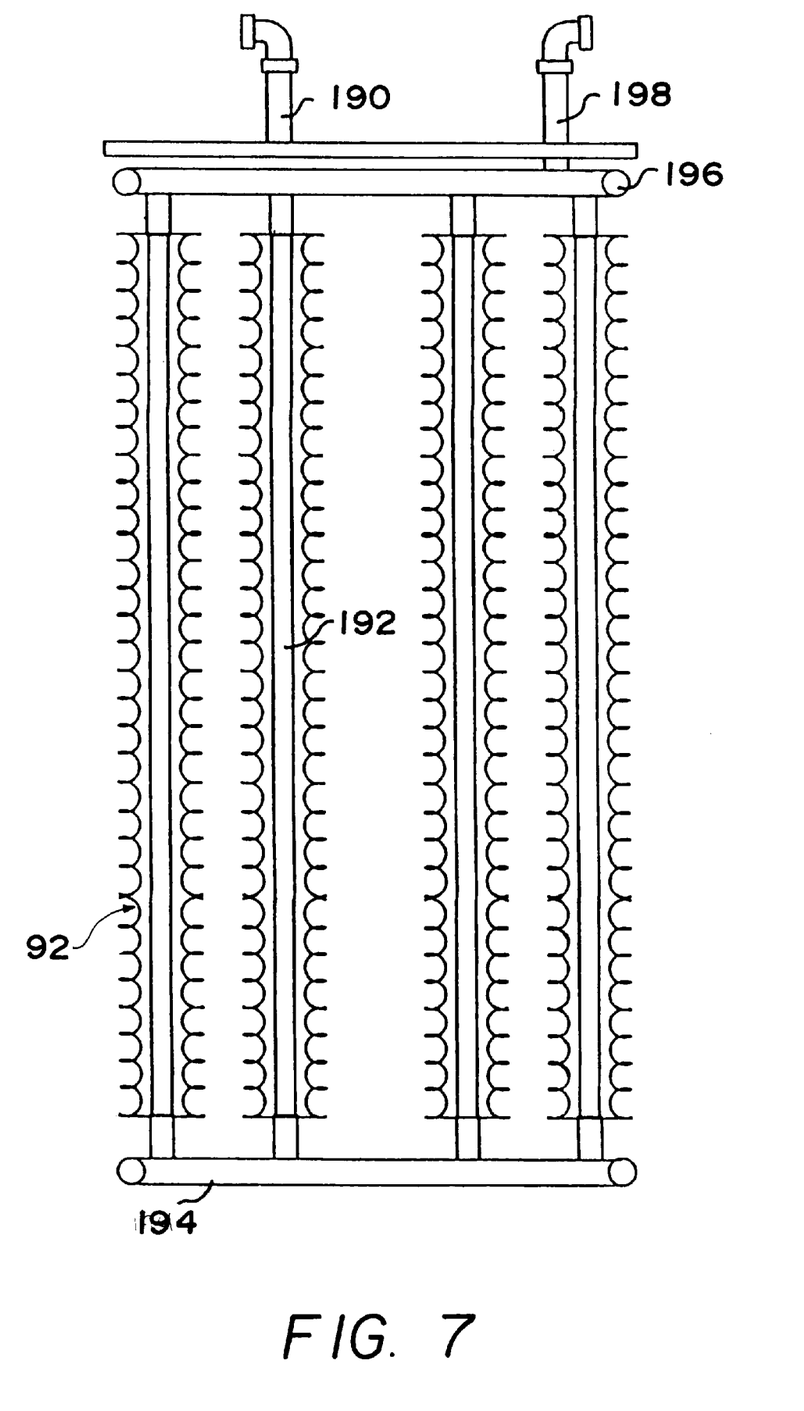
FIG. 7 shows a detail view in elevation of the finned tubing cooling cage of the mechanical cleaner of FIG. 5.

Referring to FIG. 7, there is shown a detail view in elevation of the finned tubing cooling cage of FIG. 5. Finned tubing cooling cage 92 has water inlet 190, feeding into one of a series of vertical heat dissipating elements 192. Heat dissipating elements 192 are joined at the base of the cooling cage 92 by circular lower tubing manifold 194. Heat dissipating elements 192 are similarly joined at the top of finned tubing cooling cage 92 by circular upper tubing manifold, 196. Water rises through the remaining heat dissipating elements 192 to upper tubing manifold 196, and departs finned tubing cooling cage 92 through water outlet 198, connected to the upper tubing manifold 196.

Figure 8:
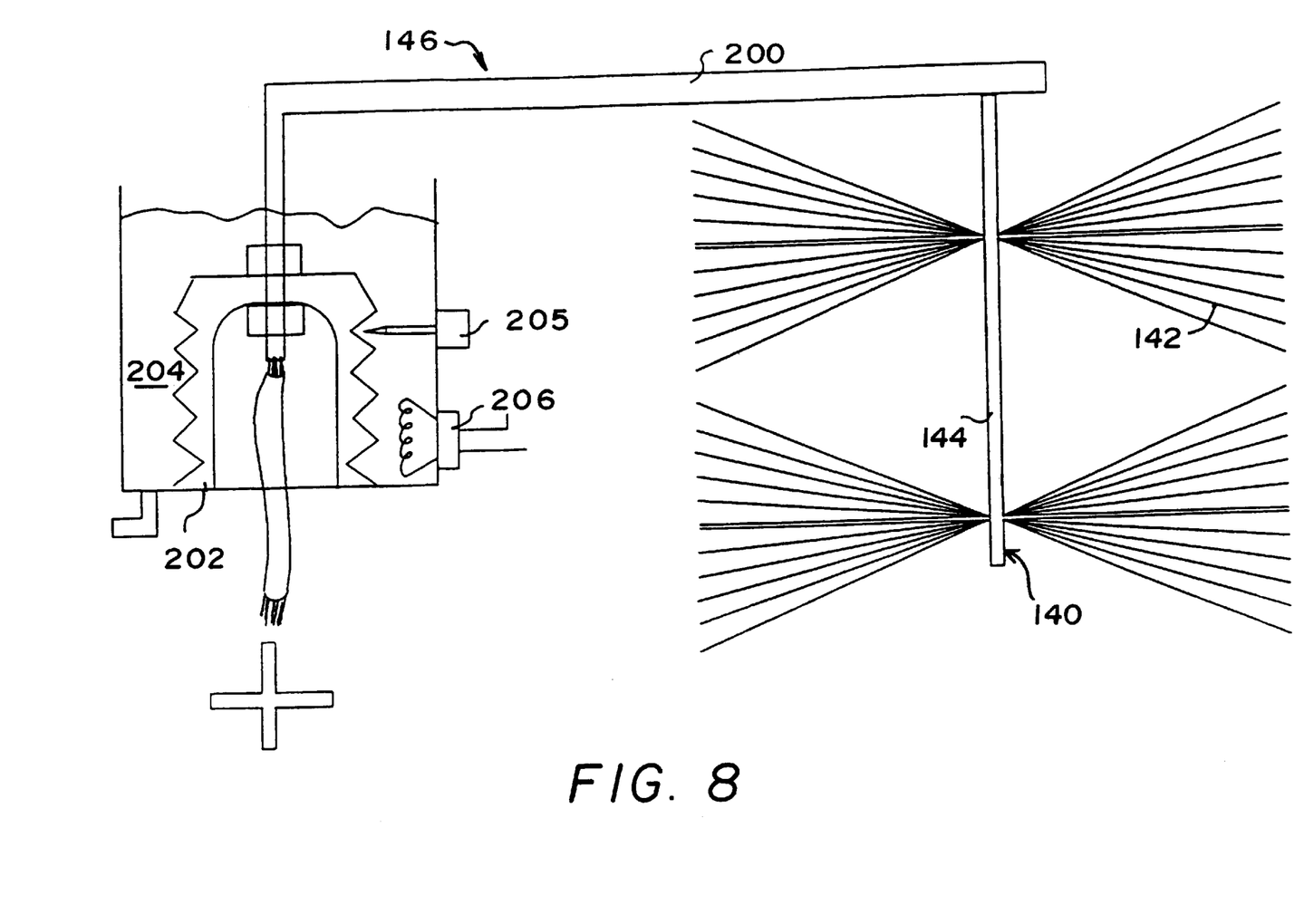
FIG. 8 shows a detail view in elevation of the electrostatic isolation and suspension system of the electrostatic precipitator of FIG. 1.

Referring to FIG. 8, there is shown a detail of the electrostatic brush suspension and isolation system of the electrostatic precipitator of FIG. 1. Stationary metallic brushes 140 serve as a negative electrode and are suspended from the center of precipitator 130(see FIG. 1) by conductive suspension arm 200 of isolation and suspension system 146, situated at the top of electrostatic precipitator 130. The conductive suspension arm 200 terminates near the outer edge of precipitator 130 in an insulating anchoring mechanism 201, which is isolated from the remainder of the system by being immersed in an oil bath 202. Oil bath 202 includes base 203 on which insulating anchoring mechanism 201 is located, and sidewall 204. Temperature sensor 205, located in sidewall 204, activates oil heater 206 to maintain oil bath 202 at a desired temperature. Brushes 140 terminate about 3 inches from cylindrical wall 136. A high voltage/low amperage (25 to 50 KV DC) power supply(not shown) is connected to conductive support 200 positive to induce a positive charge on stationary brushes 140 inside of precipitator 130. Cylindrical wall 136(see FIG. 1) serves as a negative electrode and is connected to ground.

Figure 9:
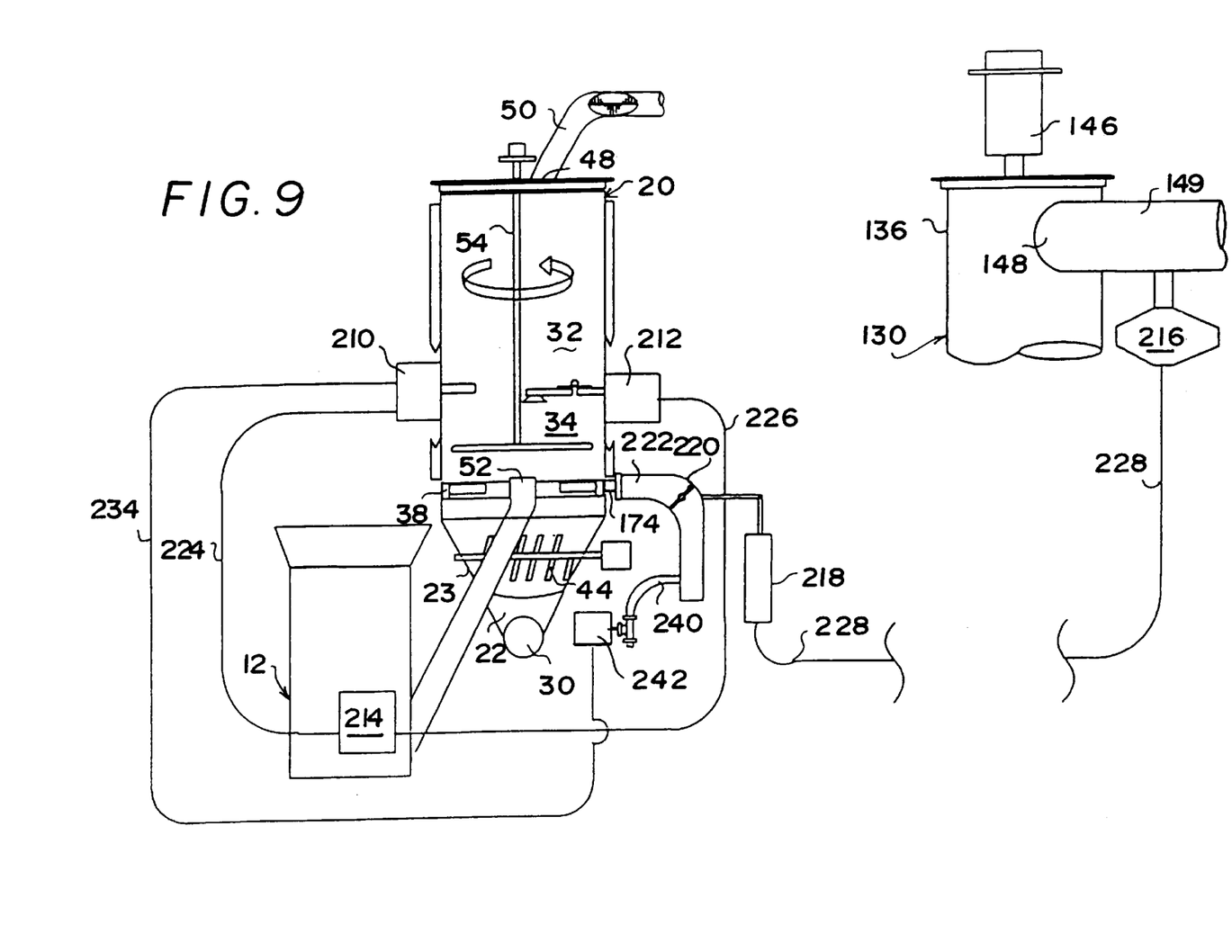
FIG. 9 shows a partial view in elevation of the gasification system of the present invention illustrating automatic solids and air feed controls systems.

Referring to FIG. 9, there is shown a diagrammatic elevation view of the automatic control system for operation of gasification system 10. Temperature sensor 210 is mounted on cylindrical wall 26 of thermal reactor 20 at a point approximately dividing upper section 32 and central section 34 so as to sense the temperature of the gasification process in thermal reactor 20. Level sensor 212 is mounted on cylindrical wall 26 of thermal reactor 20 at a point spaced from sensor 210 at about the same elevation as temperature sensor 210. Level sensor 212 senses the solids material level in thermal reactor 20. Solids feed rate controller 214 is located in feed input auger system 12 so as to control the rotational speed of main feed auger 18 such as by controlling a drive motor(not shown). Pressure sensor 216 is located at product gas outlet port 148 of product gas conduit 149 of electrostatic precipitator 130. Air inlet controller 218 is connected to air valve 220 in air feed conduit 222 connected in turn to air inlet 172 of air input manifold system 38 of thermal reactor 20. Temperature sensor control line 224 connects temperature sensor 210 to solids feed rate controller 214. Level sensor control line 226 connects level sensor 212 to solids feed rate controller 214. Pressure sensor control line 228 connects pressure sensor 216 with air inlet controller 218. Moderator water supply conduit 240, having moderator water control valve 242, is connected to air feed conduit 222. Moderator control line 234 connects temperature sensor 210 with quench water control valve 242. Sensors 210, 212, and 216, controllers 214 and 218, and valve 242, as well as control lines 224, 226, 228 and 234 may be electrical, pneumatic, or hydraulic in operation, as desired.

In operation, the main oblique feeder auger 18 is fed with waste materials from the feeder bin 14 through lock hopper 16. The main feed auger 16 is also fed with solid by-products of the process transported from solids recycle circuit 100. By-product tar and oil is loaded into the main feed auger 16 from the tar/oil recycle circuit 160 or, alternatively, drained from the system. Lock hopper mechanisms of known construction (not shown) are employed for waste material feed system 12 and ash removal system 30, that isolate the interior of the thermal reactor 20 from the outside atmosphere to maintain pressure and to prevent the loss of produced gas. The main feed auger 18 is also terminated a predetermined distance below the main feed auger outlet 52 to develop an intentional congestion of input material near the mouth of the main feed auger outlet 52, further sealing the system from the outside atmosphere. Waste materials are introduced to the thermal reactor 20 immediately above air manifold 38, and immediately below and spaced from agitation blades 174, which stir the incoming material and gasified particulates. Air enters thermal reactor 20 from the bottom of the radial manifold nozzles 40 and is preheated, therein. This feed configuration generates a stratified material bed and promotes gasification of the material bed from the bottom, upwards. Spaces between the radial nozzles 40 of air manifold 38 permit the residue resulting from the gasification process to drop to the bottom 22 of reactor 20 after passing through a clinker breaker 44, which reduces fused masses or clinkers(if present) to a finer sized passable aggregate.

In the preferred embodiment of manifold 38(See FIG. 4*a*) a controlled amount of water is added through spray nozzles 181 of spray head 180 to the upper portion of annulus 182. This is appropriate for the reaction of hydrogen deficient feed materials such as rubber tires and coal. The water may be either makeup fresh water or recirculated water from the gas cleaning and cooling system. The water provides hydrogen and oxygen when reacted with high temperature char at temperatures above 963 degrees C. The reaction of carbon and water yields carbon monoxide and hydrogen which assists in oxidation of the char(carbon) since the water causes oxidation of the carbon and its more complete reduction to ash. Temperature sensor 177 senses temperature in annulus 182 and transmits a proportional signal over line 178 to automatic control valve 179, which controls water feed to spray head 180. Valve 179 is in the closed position until the measured temperature of annulus 182 reaches a predetermined limit.(typically 1600 to 2000 degrees F., depending upon the nature of the feedstock, particularly, the level of hydrogen deficiency in the feedstock) at which time valve 179 opens to an extent necessary to allow introduction of sufficient water to maintain the annulus temperature at the desired temperature.

As gaseous effluent travels between thermal reactor 20 and mechanical cleaner 70, particulates are deposited on the walls of reactor conduit 50 connecting those two units. The deposited particulate is recovered and recycled using cleaner brushes 56 inside of reactor conduit 50 that move the particulate to the cylindrical base 74 of mechanical cleaner 70. The reactor overhead gas is tangentially injected into mechanical cleaner 70 at cylindrical base 74. As the swirling gas rises within mechanical cleaner 70, high speed rotating brushes 86 serve as collection points for particulates and condensed tars extracted from the gas. Centrifugal force transfers resulting agglomerated deposits to the interior wall of mechanical cleaner 70. The deposited particulates are dislodged from the wall of mechanical cleaner 70 by slow speed rotating brushes 94, causing the particulates to fall to the bottom discharge 84. A nominal film of particulate is continuously maintained on the interior wall of mechanical cleaner 70, which prevents metal-to-metal contact with the slow speed rotating metallic brushes 94. A preferred embodiment of the invention includes a finned tubing cooling cage 92 for heat extraction from the process gas and removal of heat introduced by the high speed rotating brush bristles. An alternate embodiment includes wrapping the exterior of the mechanical cleaner 70 in a water cooled jacket 104 to assist in the heat extraction process.

Cooling for the process gas continues as it passes through the cooling module 120, in route to the electrostatic precipitator 130. Upon exiting cooling module 120, the temperature of the product gas is below the vaporization(dew point) temperature of oils, tars and water previously carried by the gas. Condensates of those three species are collected at the base of cooling module 120 and precipitator 130. After water extraction, tar and oil is returned to main feed auger 16 for additional processing by thermal reactor 20 or discharged for byproduct usage. The process gas is further cooled and cleaned in electrostatic precipitator 130, which removes aerosols from the gas stream producing a clean, cool product gas. Clean product gas exits the system at electrostatic gas outlet port 148.

The feed rate of solids material to thermal reactor 20 is controlled by means of temperature sensor 210 and level sensor 212, operating on solids feed rate controller 214. As the reactor temperature increases, temperature sensor 210 sends control signals over control line 224 to feed auger controller 214, which acts on feed auger 18 to decrease solids feed rate such as by reducing auger rotational speed. As thermal reactor temperature decreases, temperature sensor 210 sends control signals over control line 224 to feed auger controller 214, which acts on feed auger 18 to increase solids feed rate. As the solids level in thermal reactor 20 increases, level sensor 212 sends signals over control line 226 to solids feed auger controller 214 which reduces solids feed rate of main feed auger 18. As solids in thermal reactor 20 decrease, level sensor 212 sends signals over control line 226 to solids feed auger controller 214, increasing the solids feed rate of main feed auger 18. As gas pressure at product gas port 148 in product gas conduit 149 increases, pressure sensor 216 sends signals over control line 228 to air inlet controller 218, which acts on air valve 220 in air feed conduit 222, decreasing the feed rate of air to air inlet 172 of air input manifold 38 and thus to thermal reactor 20. As gas pressure in product gas port 148 decreases, pressure sensor 216 sends signals over control line 228 to air inlet controller 218, which acts on air valve 220 in air feed conduit 222, decreasing the feed rate of air to air inlet 174 of air input manifold 38 and thus to thermal reactor 20. Upon temperature sensor 210 measuring a preset maximum temperature such as that temperature which would indicate a runaway reaction in thermal reactor 20, temperature sensor 210 sends signals over quench control line 234 to quench water control valve 242 in water quench conduit 240. Water control valve 242 is in a closed position during normal operation, but, upon receiving a signal from temperature sensor 210 indicating a maximum temperature in thermal reactor 20, water control valve 242 opens, allowing water to flow through water conduit 240 into air feed conduit 222, through air inlet 172 of air input manifold system 38 and into thermal reactor 20 to slow the reaction, therein. Water may be added to the thermal reactor to moderate the gasification process. For operation with low hydrogen fuels such as coal and tires, water may be added continuously to supply hydrogen to the process. Temperature sensor 210 may be a standard type of thermocouple. Level sensor 212 may be a vibrating reed type level sensor.

Typical waste solids feed rates for the inventive gasification system are from 300–6000 lb/hr depending on particle size, heat content, and water content of the feed. Solids feed is preferably in the range of from 10–80 lb/cu. ft. with a particle size of less than two inches and less than 30% moisture. An air input to solids feed ratio of about 1.6 to 1.0 to about 2.0 to 1.0 pounds solid fuel to pounds of air is typically maintained, depending on the particular solid fuel. The system preferably operates at slightly over ambient atmospheric pressure, which is advantageous over many gasification systems which operate at higher pressures, requiring more expensive apparatus.

The preferred design limits for the thermal reactor of the present invention are a minimum of 3 ft. to a maximum of 16 ft. in internal diameter, and a minimum of 6 ft. to a maximum of 34 ft. in height. For a thermal reactor within these size parameters, a maximum feed rate of 10,000 lbs./hr. and a minimum feed rate of 250 lbs./hr. are contemplated. The operating pressure is about atmospheric, e.g., that which enables product gas flow through the inventive system. Input air volume requirements range from 300 CFM to 2,400 CFM for the preferred thermal reactor. The operating temperature of the thermal reactor of the present invention is typically from a low of about 1000 degrees F. to about 2400 degrees F., with a preferred maximum temperature of about 1,600 degrees F., measured in the vicinity of the top of the inlet air nozzles 40 in the thermal reactor. Output product gas temperature is about 50–100 degrees F., depending on ambient temperature and use requirements of the gas product. It has been found that gasification in the inventive gasification system results in product gas with a higher combustibles content and thus a higher heating value than known prior art waste solids gasifiers, resulting in a product gas heating value (with wood waste as the feedstock) of from about 176 to about 200 BTU/st.cu.ft., which is substantially higher than the typical wood gas heating value of about 150 to 160 BTU/st.cu.ft.(See T. Reed and D.Jantzen, GENGAS, Tipi Workshop Book, Allenspark, Colo.(1982))

Intermediate temperatures in the system depend on the nature of the solids feedstock and the raw gas output from the thermal reactor. As a variety of cooling mechanisms are provided, such as exposed metal conduits, cooling jackets, cooling cages, and other indirect heat exchange equipment, the intermediate temperatures may be manipulated as desired. It is generally considered desirable to cool the raw process gas as early in the cleaning process as practicable. It is normally desirable to maintain a very substantial reduction of temperature in the process gas by the time it leaves the mechanical cleaner. Waste heat from cooling elements may be recovered for other uses, increasing overall efficiency of the system.

In an example of operation of the inventive gasification system, for a solids feed rate of 6000 lbs/hr of 20 lb. per cu. ft. material with a BTU heating value if 6000 BTU per lb., a gas output of 2400 std. cu. ft. per min. with a BTU value of 21.6 MM BTU/hr equivalent to a power output of 1800–2400 KWHr is realized.

Table No. 1 presents analysis of product gas and calculated heating value thereof for the inventive gasification system operated within normal parameters with a feedstock of wood waste having from 10 to 15% moisture content.

TABLE 1

Product Gas Energy content

| GAS | SAMPLE NO. 1 | | | SAMPLE NO. 2 | | |
|---|---|---|---|---|---|---|
| | VOL % | HHV | LHV | VOL % | HHV | LHV |
| H2 | 1.36 | 4.45 | 3.77 | 3.45 | 11.29 | 9.55 |
| CO | 28.57 | 92.57 | 92.57 | 34.04 | 110.29 | 110.29 |
| CH4 | 4.25 | 43.35 | 39.06 | 4.83 | 49.27 | 44.39 |
| C2H4 | 1.26 | 20.36 | 19.09 | 1.08 | 17.45 | 16.36 |
| HIGH CH | 0.17 | 3.40 | 3.15 | 0.10 | 17.45 | 16.36 |
| INERT | 64.39 | | | 56.50 | | |
| BTU/SCF | | 164.13 | 157.82 | | 190.30 | 182.44 |

Table 2 presents gasification system mass and energy balance estimates when processing waste wood.

TABLE 2

Material Balance Estimates for Gasification System Processing Waste Wood and Municipal Refuse

| PARAMETER | UNITS | WASTE WOOD | MUNICIPAL REFUSE |
|---|---|---|---|
| Inerts Content | % by Volume | 3.0 | 10.0 |
| Moisture Content | % by Volume | 10.0 | 30.0 |
| Amount Processed | lbs/hour | 300.0 | 250.0 |
| Inerts Input | lbs/hour | 9.0 | 25.0 |
| Moisture Input | lbs/hour | 60.0 | 75.0 |
| Condensate Water | lbs/hour | 50.0 | 56.8 |
| Stack Moisture | lbs/hour | 10.0 | 18.2 |
| Solids Output | lbs/hour | 9.0 | 25.0 |
| Inerts Output | lbs/hour | 8.25 | 25.0 |
| Carbon Output | lbs/hr | 0.75 | 1.85 |
| Tar Production | cf/lb feed | 7.6 | 15.6 |
| Air Flow Rate | cf/hour | 2280. | 3900. |
| Gas Flow Rate | cf/lb feed | 25.0 | 46.5 |
| Gas Flow Rate | cf/hour | 7500. | 11625. |

Table 3 presents gasification system mass and energy balance estimates when processing municipal refuse.

TABLE 3

Energy Balance Estimates for Gasification System Processing Waste Wood and Municipal Refuse

| CATEGORY | VARIABLE | UNITS EMPLOYED | WASTE WOOD | MUNICIPAL REFUSE |
|---|---|---|---|---|
| Fuel Parameter | Feed Rate | lbs/hour | 300 | 250 |
| | Heating Value | Btu/lb | 6,000 | 9,000 |
| | Heat Input | Btu/hour | 1,800,000 | 2,250,000.0 |
| Gas Flow Parameter | Air Flow AP | in H$_2$O | 0.5 | 1.0 |
| | Air Flow Rat | cf/min | 38 | 52 |
| | Gas Flow AP | in H$_2$O | 1.0 | 1.0 |
| | Gas Flow Rate | scf/min | 125 | 155 |

TABLE 3-continued

Energy Balance Estimates for Gasification System Processing Waste Wood and Municipal Refuse

| CATEGORY | VARIABLE | UNITS EMPLOYED | WASTE WOOD | MUNICIPAL REFUSE |
|---|---|---|---|---|
| Gas Stream Parameter | Flow Rate | scf/min | 125 | 155 |
| | Heating Value | Btu/scf | 180 | 180 |
| | Heat Output | Btu/hour | 1,250,000 | 1,675,006 |
| Thermal Efficiency | Heat Output | Btu/hour | 1,350,000 | 1,675,000 |
| | Heat Input | Btu/hour | 1,800,000 | 2,250,000 |
| | Efficiency Output/Input | % | 75 | 74 |

The particular sizes and equipment discussed above are cited merely to illustrate a particular embodiment of this invention. It is contemplated that the use of the invention may involve components having different sizes and shapes as long as the principles, i.e., low pressure gasification in a rising stratified bed surrounded by descending gasified solids, efficient handling of solids, ash and condensates, gas cleaning, and gas cooling as described above are followed. It is intended that the scope of the invention be defined by the claims appended hereto.

I claim:

1. An electrostatic precipitator for separating solids from a particle laden gaseous stream comprising:
   a. a substantially cylindrical sidewall having a vertical central axis and an integral upper closure, said cylindrical sidewall having an outlet for treated gas at an upper end thereof;
   b. an electrode disposed as a substantially cylindrical metallic brush element having a central shaft and a plurality of bristles attached therealong and extending radially and substantially perpendicular to said central shaft, said central shaft being suspended along said vertical central axis, said bristles extending substantially across said electrostatic precipitator and substantially perpendicular to said cylindrical sidewall, said bristles being spaced from said cylindrical sidewall forming an annular space therebetween;
   c. an inverted truncated conical base located below and integral with said cylindrical sidewall and having an outlet for collected particles at a lower end thereof;
   d. said conical base having a tangential inlet for said particle laden gaseous stream, said tangential inlet inducing swirl in the gaseous effluent as it travels upward within said electrostatic precipitator; and
   e. a power supply so disposed as to provide a negative charge to said electrode and a positive charge to said cylindrical sidewall; whereby said gas is introduced through said tangential inlet traveling in an upward spiral through said annular space wherein said gas is subjected to an electrical corona induced by said charged electrode and said charged cylindrical sidewall and then dischrged through said outlet.

2. The electrostatic precipitator of claim 1 further comprising suspension means located at an upper end of said cylindrical sidewall for suspending said electrode, said suspension means comprising a thermostatically controlled heated oil bath having a base and a sidewall, an insulator element attached to said base, means for attaching a suspension arm to said insulator element and said electrode, and means for attaching a lead from said power supply through said insulator to said suspension arm.

3. The electrostatic precipitator of claim 1 wherein said annular space between said metallic brush element and said cylindrical sidewall is about three inches in width.

4. The electrostatic precipitator of claim 1 further comprising a cooling jacket located on an outer surface of said cylindrical sidewall.

5. The electrostatic precipitator of claim 1 further comprising cooling coils located within said conical base.

* * * * *